3,075,835
HERBICIDAL COMPOSITION

Adolf Fischer, Mutterstadt, Pfalz, Germany, assignor to Badische Anilin- & Soda-Fabrik Aktiengesellschaft, Ludwigshafen (Rhine), Rheinland-Pfalz, Germany
No Drawing. Filed Jan. 28, 1959, Ser. No. 789,490
Claims priority, application Germany Feb. 1, 1958
1 Claim. (Cl. 71—2.6)

This invention relates to mixtures of urea derivatives and phenyl carbamic acid esters and more particularly to mixtures capable of selectively killing weeds and suppressing the growth of germinating weed seeds and/or undesirable vegetation within agricultural cultivation areas, to phytotoxic compositions containing said mixtures and to methods of controlling undesirable vegetation with the said derivatives.

The majority of the substances hitherto used for selective weedkilling in agricultural cultivated areas have the property of acting selectively on only one kind of plant growth, for example on dicotyledonous weed plants in grain crops. This is especially the case with 2,4-dichlorophenoxyacetic acid of which the weedkilling action is usually related to the leaf surface exposed to the agents, plants with larger leaf surfaces being more sensitive to the action of these substances than plants with smaller leaf surfaces. On the other hand in combating gramineous weed plants in dicotyledonous useful plants, other substances, among which are included isopropylphenyl carbamate (IPC) and alpha-chlor-N.N-diallyl-acetamide, have proved to be of good suitability. For combating dicotyledonous weeds in dicotyledonous useful plants, the use of meta-chlorophenylcarbamic acid isopropyl ester (CIPC) has recently been proposed, especially in the cultivation of carrots and onions. A disadvantage of this agent, however, lies in the fact that relatively large amounts (3 to 5 kilograms per hectare) must be used in order to achieve a satisfactory effect. Such amounts of active substance are, however, tolerated well only by carrots and onions, and then only to a certain extent by these, depending on the nature of the soil of the cultivated crop. Cultivated beetroot, which is even more important and even more common, is almost completely destroyed by such amounts. There is the further disadvantage that some of the weeds, for example *Galinsoga parviflora* and *Senecio vulgaris*, are resistant to CIPC. In order to close this gap in the effective herbicidal spectrum of CIPC, use has recently been made of a mixture of meta-chlorophenylcarbamic acid isopropyl ester (CIPC) with para-chlorophenyl-dimethylurea (CMU) for combating weeds among carrots. In the cultivation of onions, spinach and beetroot, however, this combination is not selective enough; the cultivated plants suffer very great damage or are ruined. When using CMU in cultivated areas there also exists the risk, not to be underrated, that the agent, when used repeatedly even in only small amounts on the same soil, may accumulate so that a subsequent sowing of cultivated plants may be phytotoxically affected.

One object of this invention is to provide herbicides having a highly selective action.

A further object of the invention is to provide herbicides being effective against weeds which are resistant to other herbicides or which can be destroyed only by such amounts of other herbicides as would damage the cultivated plants.

Still a further object of the invention is to provide herbicides which can be applied repeatedly without involving undesired accumulation.

Still a further object is to provide herbicides which allow the combating of weeds in the cotyledon stage of the cultivated plants.

A further object is to provide herbicides for combating deep-rooting, troublesome grasses.

A further object is to provide herbicidal compositions with synergistic properties.

These objects are achieved by a phytotoxic quantity of mixtures containing a cycloaliphatic urea derivative of the general formula

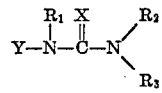

in which X represents oxygen or sulfur, Y represents a cycloaliphatic radical having from 6 to 8 carbon atoms, i.e., the cyclohexyl, cycloheptyl or cyclo-octyl radical, $R_1$ represents hydrogen or a methyl or hydroxypropyl radical, $R_2$ represents hydrogen, a methyl or ethyl radical, and $R_3$ represents an alkyl radical having from 1 to 3 carbon atoms, i.e., a methyl, ethyl or isopropyl radical, plus a phenylcarbamic acid ester of the general formula

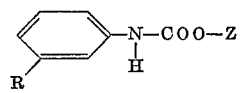

in which R represents hydrogen, chlorine or the methyl radical and Z represents a saturated or unsaturated alkyl radical having from 1 to 4 carbon atoms. Z can be a methyl, ethyl, propyl, isoproyl, butyl or isobutyl radical. The unsaturated radicals can have double or triple linkages. The propenyl, propinyl, allyl, 1,3-butenyl and 1,3-butinyl radicals may for example be mentioned. I prefer carbamic acid esters in which Z is 1,3-butinyl or isopropyl.

With the above general formulae, the following compounds are, for example, covered:

N-cyclohexyl-N'-methyl urea,
N-cyclohexyl-N',N'-dimethyl urea,
N-cyclohexyl-N-methyl-N'-methyl urea,
N-cyclohexyl-N-isopropyl-N'-methyl urea,
N-cyclohexyl-N-hydroxypropyl-N',N'-dimethyl urea;

the corresponding N'-ethyl and N'-diethyl urea derivatives; the corresponding N'-isopropyl, N'-methyl-N'-ethyl, N'-methyl-N'-isopropyl, N'-ethyl-N'-isopropyl urea derivatives; the N-cycloheptyl and N'-cyclo-octyl urea derivatives corresponding to the said N-cyclohexyl urea derivatives; the thiourea derivatives corresponding to the said urea derivatives.

By said general formulae, the following compounds are, for example, also covered:

Phenylcarbamic acid methyl ester, phenylcarbamic acid ethyl ester, phenylcarbamic acid isopropyl ester, phenylcarbamic acid allyl ester, phenyl carbamic acid butenyl ester, phenylcarbamic butinyl ester; the corresponding metachlorophenylcarbamic acid esters; the corresponding metatolylcarbamic acid esters.

The mixture to be used according to this invention has very good action against most seed weeds and annual grasses. The special advantage of these new mixtures consists in the fact that in pre-emergence treatment in the cultivation of carrots, onions, leeks, potatoes and especially beetroot, they have a evry favorable selectivity and substantially leave the cultivated plants undamaged. In general 1.2 to 2.5 kilograms per hectare is a sufficient amount of mixed active substance to be used. I do not, however, wish to limit myself to this amount. In certain cases it may be necessary to use a larger or a smaller amount of mixed active substance per hectare, for exaple from 1.0 to 5 kilograms per hectare. In every case the decisive factor is that the amount of mixed active substance per hectare used should be sufficient to achieve the desired effect. The proportion of the cycloaliphatic urea compound should as far as possible be equal to or greater than the proportion of the phenylcarbamic acid ester. The mixture of urea and phenylcarbamic acid ester is not restricted to a definite mixing ratio. This ratio may vary within wide limits. For example from 0.1 to 10 parts by weight of urea may be mixed with 1 part by weight of phenylcarbamic acid ester. The choice of the most favorable mixing ratio for a given crop must be left to the expert since the optimum depends on many factors, e.g. soil, climate, season, type of useful plants and type of weeds. For example, at 1.3 kilograms per hectare of cyclooctyl-dimethylurea, the weeds *Atri-plex patulum, Galinsoga parviflora, Raphanus raphanistrum, Sinapis arvensis, Chamomilla matricaria, Urtica urens, Spergula arvensis* and *Poa anua* are destroyed in a sugar beet field without specific damage to the cultivated plants. By adding, in addition to the said substance, 0.4 to 1.3 kilograms per hectare of meta-chlorphenyl-carbamic acid-1.3-butinol ester there is achieved, along with a favorable selectivity, a considerable extension of the spectrum of weeds which can be controlled, including *Polygonum persicaria, Stellaria media* and *Rumex acetosella*. As a further important advantage over the above-named known mixtures (CIPC and CMU) there may be mentioned the considerably shorter stability in the soil which ensures a disappearance of the phytotoxic effect usually after 6 to 8 weeks. The agent may therefore be used 4 to 8 weeks before sowing or planting the cultivated plants, as for example tobacco, cabbage, lettuce, spinach and sugar beet.

The application of the mixtures in solid granular form, preferably in admixture with calcium nitrate, is very advantageous in respect of the extension of the period of use. There can thus be carried out a successful combating of weeds in the cotyledon stage of the cultivated plants, for example carrots, spinach and sugar beet. For practical use no definite mixing ratio between the mixed active substances and calcium nitrate is needed. What matters is that there should be applied to the soil a sufficient amount of the mixed active substances (urea derivative and carbamic acid ester) to ensure that the desired action is achieved. The choice of the proper mixing ratio depends entirely on local soil conditions and must therefore be left to the expert. Use in this way moreover makes possbile the combating of annual grasses which germinate near the surface, as for example *Agrostis spica vente* in winter crops, and, when mixed with chlorinated phenoxy-fatty acids or chlorinated benzoic acids, the simultaneous combating of broad-leafed weeds, this versatility being of great economic importance.

In the combating of deep-rooting troublesome grasses, as for example *Avena fatua* in root vegetable cultivations, such as beetroot cultivations, the incorporation of a small amount of about 1.5 to 2.5 kilograms per hectare of a chlorinated benzoic acid, for example 2,3,5,6-tetrachloro benzoic acid, or a chlorinated lower fatty acid, for example trichloracetic acid, alpha,alpha-dichloropropionic acid, alpha,alpha-dichlorbutyric acid, alpha,beta,beta-trichlorisobutyric acid or alpha,alpha,beta,trichlorbutyric acid or their salts, esters or amides, achieves a very favorable effect.

There are preferred halogenated acids which have from 2 to 4 chlorine atoms and lower fatty acids which have from 2 to 4 carbon atoms in the molecule. It is not essential by which bases the salts and by which alcohols the esters have been formed. The sodium and potassium salts and the methyl and ethyl esters are preferred. Unsubstituted amides are preferred. The essential part of the molecule of said compounds is the acyl radical containing a phenyl group or a lower alkyl group which groups contain from 2 to 4 chlorine atoms. For example in this way *Avena fatua* can be destroyed to the extent of up to 70% without damage to the beetroot plants. It is to be understood, however, that the amount of chlorinated benzoic acids or lower chlorinated fatty acids to be admixed is not restricted to the weights given above. In many cases it may be advantageous to incorporate more or less chlorinated fatty acid than is suggested above, for example from 1.5 to 10 kilograms per hectare. The mixing ratio may be 1 to 10 parts of chlorinated benzoic acids or chlorinated fatty acids to 1 part of the mixture of urea derivatives and phenylcarbamic acid esters.

The mixtures of substances may also be used as aqueous emulsions or dispersions. For the preparation of the dispersions there may be used surface-active substances of anionic, cationic or electroneutral type, for example sodium alkylnaphthalene sulfonate, sodium lignin sulfonate, sodium lauryl sulfate, glycerine monostearate, polyethylene oxides and quaternaryammonium salts. An incorporation of organic solvents, as for example methanol, isopropanol, isobutanol, xylene, toluene, cresol or cyclohexanone, is often advantageous. The use of the said herbicidal compounds is, however, not limited to this form. In order to use the active substances as dusting or strewing agents, they may be mixed with inert solid substances, as for example talc, bentonite, pyrophyllite, diatomaceous earth or silica gel, or with fertilizers, preferably calicum nitrate.

The urea compounds to be used in the mixtures claimed by me may be prepared in accordance with the particulars given U.S. patent specification 2,661,272 while the phenylcarbamic acid esters may be prepared in accordance with the particulars given in U.S. patent specification 2,788,268.

The following examples will further illustrate this invention but the invention is not restricted to these examples.

EXAMPLE 1

Monogerm seeds of sugar beet are sown in sandy loamy soil. Onto the soil thus prepared there is sprayed after 4 days a dispersion of a mixture of 0.7 kilogram of N-cycloheptyl-N',N'-dimethyl-urea, 0.5 kilogram of metachlorophenylcarbamic acid isopropyl ester (CIPC), 1 kilogram of silica gel and 0.3 kilogram of sodium alkylnaphthalenesulfonate in 500 liters of water per hectare. The sugar beet plants sprout well after about 12 days. Even after 4 weeks no specific damage to the sugar beet plants can be determined. The following weed plants are checked in sprouting or destroyed in the cotyledon stage by this treatment: *Stellaria media, Sinapis alba, Matricaria inodora, Galinsoga parviflora, Spergula arvensis, Urtica urens, Chenopodium album, Polygonum persicaria, Lolium perenne*.

The same action against the weeds is achieved with the same amount of a mixture of para-chlorophenyldimethylurea (CMU) and meta-chlorophenylcarbamic acid isopropyl ester (CIPC), but part of the sugar beet plants suffer damage to the extent of up to 60%.

An action similar to that described in paragraph 1 of this example, both on the weeds and on the sugar beet, is achieved with the following mixtures per hectare: 0.7 kilogram of N-cyclohexyl-N',N'-dimethylurea and 0.5 kilogram of meta-chlorophenylcarbamic acid-1,3-butinyl ester, 0.9 kilogram of N-cyclohexyl-N',N'-dimethyl-urea and 0.5 kilogram of meta-chlorophenylcarbamic acid-1,3-butenyl ester; 1.3 kilograms of N-cyclo-octyl-N'-methylurea and 0.7 kilogram of meta-chlorophenylcarbamic acid propargylic ester.

EXAMPLE 2

A mixture of the following composition is sprayed onto sandy soil: 1 kilogram of N-cyclo-octyl-N',N'-dimethylurea, 1 kilogram of meta-chlorophenylcarbamic acid-1,3-butenyl ester, 1.5 kilograms of silica gel and 0.5 kilogram of sodium lignin sulfonate in 1000 liters of water per hectare. An adjacent lot is treated with a mixture of equal amounts of para-chlorophenyldimethylurea and meta-chlorophenylcarbamic acid isopropyl ester. Six weeks after this treatment, a sowing of sugar beet is made.

On the lot treated with cyclo-octyldimethylurea and meta-chlorophenylcarbamic acid butenyl ester, the sugar beet plants sprout without specific damage, whereas on the lot treated with the second mixture, up to 70% are damaged.

An effect similar to that with N-cyclo-octyl-N',N'-dimethylurea and meta-chlorophenylcarbamic acid-1,3-butenyl ester is achieved with the following mixtures in the same proportions: N-cyclohexyl-N',N'-dimethylurea +phenylcarbamic acid isopropyl ester; N-cyclohexyl-N',N' - dimethylurea+meta-methylphenylcarbamic acid ethyl ester; N-cyclooctyl - N',N' - diethylthiourea+meta-chlorophenylcarbamic acid-1,3-butinyl ester; N-cyclo-octyl-N-2-hydroxypropyl - N',N' - dimethylurea+phenylcarbamic acid - 1,3 - butinylester; N - cyclo - octylmethylmethyl - N',N' - dimethylurea+methamethylphenylcarbamic acid propargylic ester; N-cyclohexyl-N-methyl-N',N' - dimethylurea+metamethylphenylcarbamic acid-1,3-butinyl ester; N-cyclo-octyl-N',N' - dimethylthiourea +meta-chlorophenylcarbamic acid methyl ester.

EXAMPLE 3

Beetroot, carrots and onions are sown in a cultivated area. On the same day the sown beds are treated per hectare with an aqueous dispersion of 0.93 kilogram of N-cyclo-octyl-N',N'-dimethylurea, 0.67 kilogram of meta-chlorophenylcarbamic acid-1,3-butinyl ester, 1 kilogram of silica gel, 1 kilogram of bentonite and 0.4 kilogram of sodium lignin sulfonate. Eight weeks later, the cultivated plants are growing very well. The effect on the weeds, similarly after eight weeks, may be seen from the following table which gives the number of weed plants to be found at that time; the individual numbers are the average of 14 repetitions:

Table

In this table, column A gives the name of the weed plant in question, column B gives the number of weed plants on an untreated lot, and column C gives the number of weed plants on a lot of the same size which has been treated with 0.93 kilogram per hectare of N-cyclo-octyl-N',N'-dimethylurea and 0.67 kilogram per hectare of meta-chlorophenylcarbamic acid-1,3-butinyl ester:

| A | B | C |
|---|---|---|
| Atriplex patulum | 124 | 2 |
| Stellaria media | 92 | 0 |
| Cruciferae | 8 | 1 |
| Polygonum persicaria | 18 | 0 |
| Galinsoga parviflora | 22 | 0 |
| Maricaria inodora | 18 | 0 |
| Spergula arvensis | 6 | 0 |
| Senecio vulgaris | 6 | 0 |
| Capsella bursa pastoris | 1 | 0 |
| Urtica urens | 21 | 0 |
| Sonchus arvensis | 3 | 3 |
| Rumex acetosella | 44 | 0 |
| other weeds | 55 | 6 |
| grasses | 103 | 7 |
| Total | 521 | 19 |

This represents a 96.4% extermination.

EXAMPLE 4

Seeds of peas, beetroot, carrots, onions, mustard and wild oats are sown in transverse rows in seed dishes (25 x 30 cm.) filled with light sandly soil. After most of the plants have developed to the cotyledon stage there is uniformly strewn over the plants and the soil in the individual dishes a finely grained mixture of N-cyclohexyl - N',N' - dimethylurea, meta-chlorophenylcarbamic acid isopropyl ester and calcium nitrate at a rate of 0.9, 0.6 and 148.5 kilograms, respectively, per hectare. Five weeks later it is found that the peas, beetroot and carrots have withstood this treatment without detriment to growth. Wild oats, mustard and onions have been damaged severely. Of the weeds which had already sprouted between the cultivated plants, the following have been practically completely destroyed: Galinsoga parviflora, Matricaria chamomilla, Urtica urens, Poa annua, Chenopodium album and Stellaria media.

The following combinations are similarly active in admixture with calcium nitrate and in the same amounts of active substances:

N - cyclo - octyl-N',N'-dimethylurea+meta-chlorophenylcarbamic acid isopropyl ester N - cyclo - octyl - N',N'-dimethylthiourea+meta-chlorophenylcarbamic acid 1,3-butenyl ester N - cycloheptyl - N',N'-dimethylthiourea+meta-chlorophenylcarbamic acid isopropyl ester N - cyclo - octyl-N',N'-isopropylurea+meta-chlorophenylcarbamic acid 1,3-butinyl ester

EXAMPLE 5

After sugar beet plants in a cultivated area have been thinned out and after the soil has been hoed, they are treated with a mixture of 1.5 kilograms of N-cycloheptyl-N',N'-diethylurea, 1 kilogram of meta-methylphenylcarbamic acid-1,3-butinyl ester and 197.5 kilograms of calcium nitrate per hectare. The mixture is obtained by fusing the said amounts of active substance with the calcium nitrate at 96° C. and forcing the melt through a 1 millimeter sieve after moderate cooling.

Fresh growth of weeds between the individual rows no longer occurs up to the harvesting of the sugar beet plants. The following weeds are destroyed upon sprouting or in the cotyledon stage: Urtica urens, Chenopodium album, Galinsoga parviflora, Poa annua and Panicum sanguinale. The beet plants do not suffer any damage by this treatment.

EXAMPLE 6

An aqueous dispersion of a mixture of 2 kilograms of N-cyclo-octyl-N',N'-dimethylthiourea, 1 kilogram of meta-chlorophenylcarbamic acid isopropyl ester, 0.5 kilogram of silica gel and 0.5 kilogram of sodium lignin sulfonate is applied per hectare to a potato field shortly prior to the sprouting of the cultivated plants. The potato plants sprout normally and with leaves of deep green color after this spraying. Even after some weeks, no damage can be detected in the potato plants. On the other hand, Chenopodium album, Stellaria media, Sinapis arvensis, Panicum sanguinale and Matricaria inodora are suppressed in growth or destroyed for a period of more than 10 weeks.

Compared with this, a mixture of CMU and CIPC clearly exhibits growth inhibition and chlorotic leaf damage in the same cultivated plants when solutions of the same concentration are used.

EXAMPLE 7

A fine-grained mixture of 0.7 kilogram of N-cyclooctyl-N',N'-dimethylurea, 0.3 kilogram of meta-chlorophenylcarbamic acid isopropyl ester, 0.7 kilogram of 2-methyl-4-chlorophenoxy-alpha-propionic acid, 0.3 kilogram of 2,3,5,6-tetrachlorobenzoic acid and 248 kilograms of calcium nitrate per hectare is scattered in early spring on a winter rye crop, which is very strongly infested with the weeds: Agrestis spica venti, Stellaria media and Galium aparine. After about four weeks the said weed plants are for the most part withered. The winter rye exhibits a slight depression in growth, but then continues to grow normally without further damage.

EXAMPLE 8

Wild oat seedlings in cultivated areas of sugar beet and spinach are destroyed to the extent of 70% by one spraying with an aqueous dispersion of a mixture of 1.2 kilograms of N-cyclohexyl-N',N'-diethylurea, 0.4 kilogram of metachlorophenylcarbamic acid ethyl ester, 2 kilograms of sodium alpha,alpha-dichlorobutyrate and 0.4 kilogram of sodium alkylnaphthalene sulfonate per hectare. The spraying is carried out directly after the sowing of the sugar beet and spinach seeds. No damage to the said cultivated plants can be observed 10 weeks after the spraying.

A similar result is achieved by adding, instead of alpha,alpha-dichlorobutyric acid, other chlorinated fatty acids, as for example trichloroacetic acid, alpha,alpha-dichloropropionic acid, alpha, alpha, beta-trichlorobutyric acid or alpha,beta,beta-trichloroisobutyric acid in the same amounts.

I claim:

A selective herbicide comprising a phytotoxic quantity of a mixture of from 0.1 to 10 parts by weight of N-cyclooctyl-N',N'-dimethyl urea to 1 part by weight of meta-chlorophenylcarbamic acid 1,3-butinyl ester.

References Cited in the file of this patent

UNITED STATES PATENTS

| | | |
|---|---|---|
| 1,496,436 | Steinhart | June 3, 1924 |
| 2,649,363 | Swezey | Aug. 18, 1953 |
| 2,661,272 | Searle | Dec. 1, 1953 |
| 2,709,648 | Ryker et al. | May 31, 1955 |
| 2,726,947 | Baumgartner | Dec. 13, 1955 |
| 2,734,911 | Strain | Feb. 14, 1956 |
| 2,788,268 | Tursich | Apr. 9, 1957 |
| 2,812,247 | Gysin et al. | Nov. 5, 1957 |
| 2,857,260 | Woodward | Oct. 21, 1958 |

OTHER REFERENCES

Pridham in "Proceedings, Northeastern Weed Control Conference," Jan. 8, 9, 10, 1958, pages 108 to 111.

UNITED STATES PATENT OFFICE
CERTIFICATE OF CORRECTION

Patent No. 3,075,835 January 29, 1963

Adolf Fischer

It is hereby certified that error appears in the above numbered patent requiring correction and that the said Letters Patent should read as corrected below.

Column 2, line 4, for "syngergistic" read -- synergistic --
line 62, for "evry" read -- very --; lines 68 and 69, for
"exaple" read -- example --; column 3, line 13, for "Atri-plex",
in italics, read -- Atriplex --, in italics; line 15, for
"anua", in italics, read -- annua --, in italics; line 45, for
"possbile" read -- possible --; column 5, line 15, strike out
"methyl"; same line 15, for "methamethylphenylcar-" read --
metamethylphenylcar- --; same column 5, in the table, first
column, line 6 thereof, for "Maricaria", in italics, read --
Matricaria --, in italics; line 63, for "sandly" read -- sandy --

Signed and sealed this 17th day of September 1963.

(SEAL)
Attest:

ERNEST W. SWIDER
Attesting Officer

DAVID L. LADD
Commissioner of Patents